United States Patent [19]

Beller

[11] 4,203,462
[45] May 20, 1980

[54] WATER LEVEL CONTROL SYSTEM

[75] Inventor: W. E. Beller, Park Ridge, Ill.

[73] Assignee: The Singer Company, New York, N.Y.

[21] Appl. No.: 947,498

[22] Filed: Oct. 2, 1978

[51] Int. Cl.² ................. F15C 1/18; H01H 35/34
[52] U.S. Cl. ......................... 137/393; 68/207; 134/57 D; 137/387; 137/842; 200/83 WM
[58] Field of Search ........... 68/207; 134/57 D, 57 R; 73/290 R, 298; 137/386, 387, 393, 842; 200/83 WM

[56] References Cited

U.S. PATENT DOCUMENTS

| | | | |
|---|---|---|---|
| 2,511,649 | 6/1950 | Reiter | 73/297 |
| 2,813,944 | 11/1957 | Tyzack | 68/207 UX |
| 2,885,879 | 5/1959 | Bloom | 68/207 |
| 3,291,932 | 12/1966 | Main | 68/207 UX |
| 3,334,651 | 8/1967 | Clearman | 137/387 |
| 3,344,804 | 10/1967 | Lyman | 68/207 |
| 3,581,754 | 6/1971 | Adams | 137/393 |
| 3,602,250 | 8/1971 | Neenan | 137/386 |

Primary Examiner—Martin P. Schwadron
Assistant Examiner—G. L. Walton

[57] ABSTRACT

The solenoid operated water valve has a Venturi on its outlet which aspirates air through the pressure sensing side of a pressure switch until the water level in the washing machine reaches the end of the tube connected to the system through the selection valve. This prevents further aspiration and the Venturi rapidly lowers the pressure in the pressure switch to actuate the switch. The check valve prevents venting the pressure switch to atmosphere long enough for the associated timer to continue the machine program.

4 Claims, 2 Drawing Figures

WATER LEVEL CONTROL SYSTEM

CROSS REFERENCE TO RELATED APPLICATION

The illustrated Venturi construction is shown and claimed in my copending application Serial No. 947,472 filed Oct. 2, 1978.

BACKGROUND OF THE INVENTION

Water levels in washing machines are customarily sensed by pressure switches which are very satisfactory over the normal water level range but become impractical and expensive if required to sense very low levels. This is due to the small pressure differential available which then requires very sensitive switch arrangement. A fresh approach to the problem of sensing very low water levels is indicated.

SUMMARY OF THE INVENTION

The principal object of this invention is to provide a control system capable of sensing very low water levels. This has been accomplished by providing a Venturi on the water valve filling the washing machine. The Venturi is aspirated through the pressure chamber side of a pressure switch and draws air through a tube depending into the washing machine tub. When the water level reaches the end of the tube air flow is prevented and the Venturi quickly lowers the pressure in the pressure switch to actuate the switch. It is practical to lower the pressure 20" while sensing within ¼". The pressure switch itself can be quite simple and inexpensive.

A further object is to adapt such a control system to sensing multiple levels. This is done by providing multiple level sensing tubes depending into the tub and selecting which is to be effective—that is, selecting which tube is to be in the aspirating path. This arrangement eliminates the need for adjustment of the pressure switch and permits use of a very simple, low cost pressure switch. There is no need for a pressure switch reset mechanism to accommodate those situations where the user selects a higher level setting after the switch has tripped at a lower setting since the connecting of a tube having its end above the water level will vent the pressure chamber to atmosphere and cause the switch to reset.

A further object is to prevent the system from chattering after sensing the desired level as would be the case if the pressure chamber was vented as soon as flow stopped. To avoid constant cycling a check valve is used to prevent venting the pressure chamber through the Venturi.

DETAILED DESCRIPTION OF THE DRAWINGS

Figure 1:
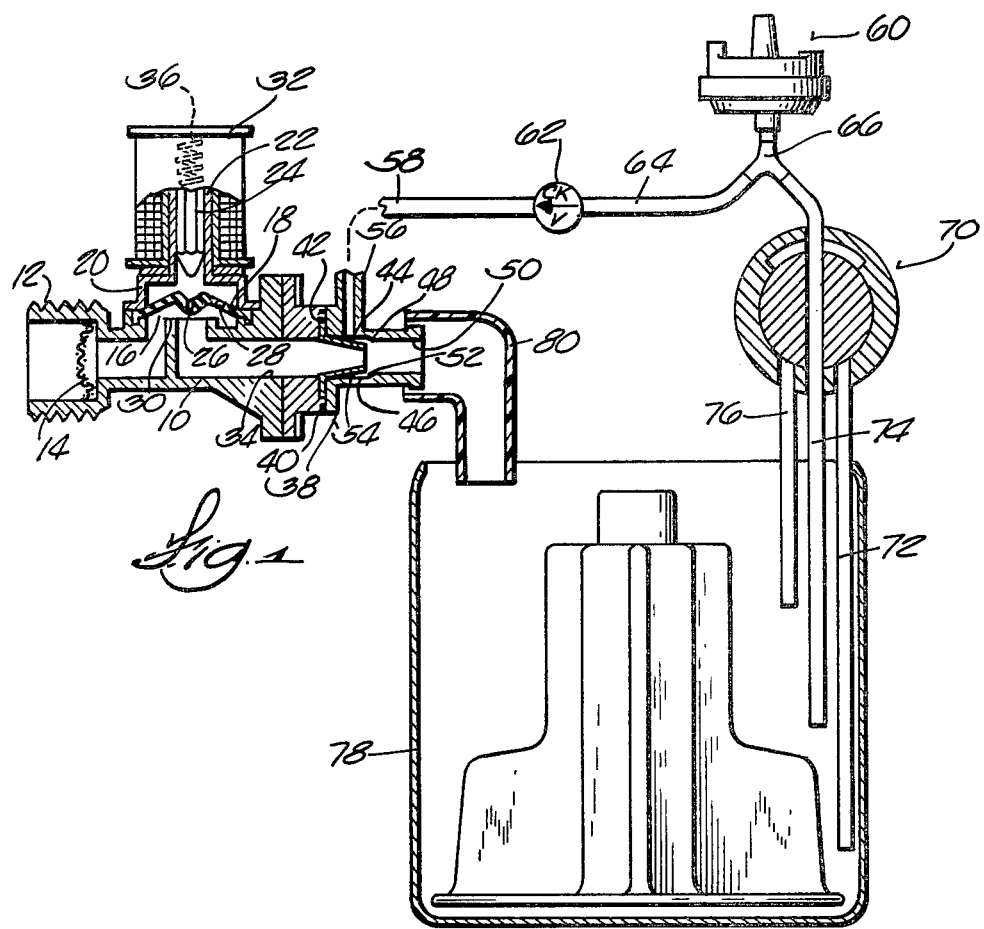
FIG. 1 is a semi-schematic showing of the system.
Figure 2:
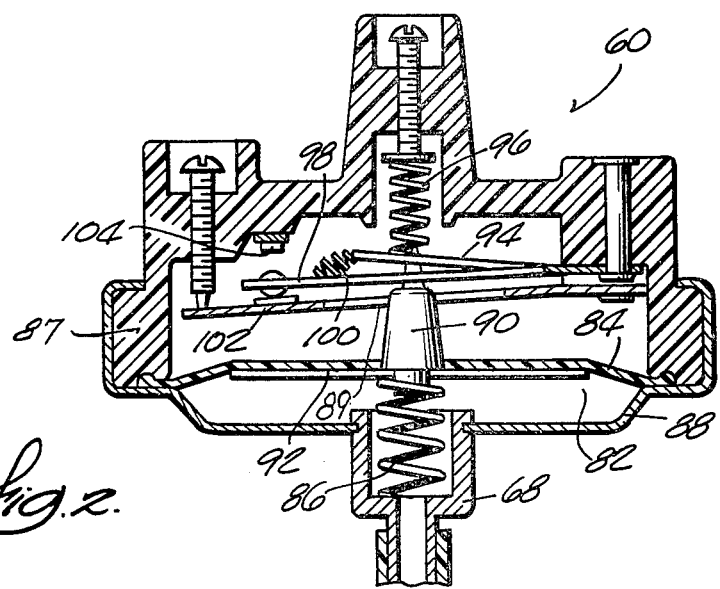
FIG. 2 is an enlarged cross section of the pressure switch used in the system.

This invention is described in conjunction with a solenoid operated diaphragm valve widely used in the appliance field for controlling water flow into washing machines and the like. The valve housing 10 has an inlet 12 provided with a strainer screen 14 leading to the annular inlet area 16 underlying the diaphragm 18 captured between the body 10 and cover 20 having a tubular extension 22 housing the plunger 24. The plunger tip constitutes a valve controlling flow through the central aperature 26 in the diaphragm. The outer portion of the diaphragm is provided with a small vent passage 28 permitting water to flow to the space between the diaphragm and cover 20 until the pressure in that space equals the inlet pressue and, assuming the central aperature 26 is closed by the plunger, the pressure will force the diaphragm down to close on seat 30. When the coil 32 is energized, the plunger is pulled into the coil, opens the central vent and dumps the water from the space between the diaphragm and the cover this allows the inlet pressure to push the diaphragm to the position shown to establish flow to the outlet passage 34. When the coil is deenergized, spring 36 will push the plunger to close the central hole 26 at which time the pressure rapidly builds up above the diaphragm to close the diaphragm.

A molded housing 38 is mounted on the body 10 and sealed by O-ring 40 with the flange portion 42 of the drawn tapered eyelet 44 captured between the fitting and the body. It will be noted that the housing 38 has a larger diameter bore 46 generally equal to the diameter of the outlet 34. The larger diameter leads to a shoulder 48 where the bore is reduced to a smaller diameter bore 50. The tapered eyelet 44 gradually tapers to a smaller diameter with the flow velocity increasing throughout the length of the eyelet. The eyelet terminates approximately at the same axial position as the shoulder 48 and the diameter of the eyelet at this point is slightly less than the diameter of the reduced bore 50 leaving an annular space 52 between the shoulder and the eyelet. Due to the high velocity flow at the exit of the eyelet there will be a reduced pressure at the annular space 52 and this reduced pressure will be communicated to and prevail in the tapered chamber 54 between the eyelet and the larger bore 46. The change in the diameters between the tapered end and the reduced bore is not so abrupt as to cause appreciable turbelence adversely effecting the Venturi effect. The axial position at the end of the eyelet is not critical and the eyelet can even extend into the reduced bore 50.

The pressure in chamber 54 can be sensed through nipple 56. Thus, tube 58 can be fitted onto nipple 56 and connected to pressure switch 60 via check valve 62, tube 64, and "Y" 66 connected to the inlet 86. The other branch of the Y is connected to selector vale 70 which permits venting to any of the 3 tubes 72, 74, 76 respectively depending to low, medium and high level positions in washing machine tub 78. Assuming that the "low" tube is connected to the Y by valve 70 air will be aspirated through tube 72, and valve 70, Y 66, and check valve 62 to the Venturi until the water flowing out of outlet 38 through fill elbow 80 into the tub reaches the lower end of the tube 72. The usual pressure switch operates in response to an increase in pressure but the present control responds to a decrease in pressure. Thus when the water level reaches the end of tube 72 the pressure in chamber 82 will drop rapidly to move diaphragm 84 down against the bias of spring 86. As seen in the drawing the perimeter of the diaphragm is captured between housing 87 and cover 88. Post 90 projects upwardly from diaphragm pad 92 between the side rails of support 89 and the side rails of blade 98 and is connected to switch blade tongue 94. When the diaphragm moves down spring 96 acting on tongue 94 can push the tongue over center with respect to blade 98 causing the barrel spring 100 to drive blade 98 from fixed contact 102 upwardly to engage contact 104. Typically, when the timer advances to the fill interval the circuit to the water valve is closed and the timer motor drive is opened and this condition continues until the pressure switch opens the valve circuit and closes the motor circuit to continue the program.

The Venturi can easily draw a 20" vacuum on a ⅛" change in level and the accuracy of sensing is very high. When the sensed level is reached and the switch trips the water flow stops. This would vent the pressure chamber 82 but for provision of the check valve 62 which now closes and the partial vacuum in chamber 82 is maintained and the control will not hunt. If the operator should now select a higher level before the timer opens the fill valve circuit the higher level tube would of course vent the pressure switch and the switch would reset and the fill cycle would resume. Therefore the pressure switch need not be provided with a reset mechanism.

While this control was motivated by the need to select very low levels it is adapted to selection of multiple levels and the costs can be generally equivalent to prior controls. The ability to sense very low water levels makes it useable in dishwashers and in washing machines having provision for very small loads.

It will be appreciated the selector valve 70 need not provide for closure of the lowest conduit 72 since if a higher level is desired submerging the end of 72 will not prevent continued aspiration through the higher tubes. Put another way, the selector valve only needs to provide for closure of the conduits positioned above the lowest.

I claim:

1. A control system for sensing the water level in a container and effecting a control function in response thereto, the system including a valve controlling flow into the container, a pressure switch having a diaphragm operated switch responsive to pressure in a chamber, characterized by,
    a Venturi on the outlet of said valve,
    a conduit connected to the low pressure point of the Venturi and having an end terminating at the level in said container to be sensed whereby air is aspirated through the conduit into the Venturi so long as the end of the conduit is above the level in the container,
    said conduit being connected to said chamber so the chamber pressure drops to actuate the switch when the container level reaches the end of the conduit preventing further aspiration through the conduit, said switch being actuated in the oppostie sense upon restoration of atmospheric pressure in the chamber through said end of the conduit and check valve in the conduit between the pressure switch and the venturi preventing flow from the venturi to the pressure switch.

2. A control system according to claim 1 including a plurality of conduits terminating at various levels in the container,
    and valve means between the conduits in the container and the pressure switch chamber for determining which of the conduits is in effective communication with the chamber for determining which level is to be sensed.

3. A control system for regulating the level to which a container is filled comprising, an electrically operated valve operable to flow water into the container when open, a pressure switch for de-energizing the valve in response to a given pressure, characterized by,
    a Venturi in the water flow path from the valve to the container,
    conduit means connected to the low pressure part of the Venturi and having an open end positioned at the level desired in the container so the Venturi is aspirated through the conduit means until said open end is closed by water,
    said conduit means being connected to the pressure chamber of the pressure switch so the chamber pressure drops when said open end is closed,
    said pressure switch responding to the reduction of pressure in the chamber to de-energize the valve, means preventing air flow from the venturi to the pressure chamber when the water valve closes whereby the reduced pressure in the chamber is maintained until the chamber is vented from said open end of the conduit means, at which time the chamber pressure is restored to atmospheric and the switch is actuated back to its original position.

4. A control system according to claim 3 in which the preventing means is a check valve in the conduit means between the Venturi and the pressure chamber allowing flow only towards the Venturi.

* * * * *